United States Patent Office 2,934,433
Patented Apr. 26, 1960

2,934,433

FISH PROTEIN PRODUCT AND METHOD OF PREPARING THE SAME

Horace N. Brocklesby, Los Alamitos, and John R. Patrick, San Pedro, Calif., assignors to H. N. Brocklesby and Associates, San Pedro, Calif., a copartnership No Drawing. Application March 14, 1958
Serial No. 721,368

7 Claims. (Cl. 99—7)

This invention relates to the utilization of certain fluid by-products of fish canneries. More particularly this invention relates to a method of treating fish stick water whereby the same can be made more useful.

Fish stick water is a by-product of fish canning which has been difficult to handle. Viewed as a waste product, its disposal is troublesome because of its tendency to putrify, to give rise to noxious odors and to pollute bodies of water into which it is dumped. The odoriferous quality of fish stick water is due to the decomposition of protein material by enzymatic and bacterial action. Also, fish stick water contains potentially valuable protein material. A major problem has been the efficient utilization of this protein material.

The fish with which this invention is concerned may be of any kind but are primarily commercial, marine types of fish which are processed and canned on a large scale; e.g., tuna, sardines, mackerel, anchovies, salmon and the like.

Fish stick water is normally produced as follows: Fish scrap (including heads, tails, viscera and even whole fish which are purposely rejected or which find their way into scrap by accident) is cooked, e.g., at steam gauge pressures up to 5 p.s.i. for periods of 7–15 minutes. The cooked scrap is then pressed, e.g., in a continuous screw press, to remove most of the water and oil. The press cake or solids separated in this manner usually contains about 50% moisture and it is dried to form the fish meal of commerce. The filtrate separated from the press cake is what is known as "fish press water." It contains usually about 5–10% solids, including some oil as part of the "solids." The non-oleaginous solids consist chiefly of insoluble and soluble proteins; of other water soluble nitrogenous compounds such as proteoses, peptones and amino acids; and of vitamins and other growth factors.

At the present time fish press water is heated, e.g., to 190° F. and centrifuged to remove the residual oil. This leaves an aqueous portion containing, in a typical case, about 1% oil, 0.75% to 1.25% insoluble protein particles and 3–5% soluble proteins and other soluble nitrogenous materials, vitamins and various growth factors. This aqueous product is called fish stick water. It is usually acidified to a pH of 4 to 5 and held at 180° F. to preserve it until it is evaporated to a solids content of about 50%. This concentrate is the condensed fish solubles of commerce.

Condensed fish solubles are a valuable supplement to animal feeds because of the broad spectrum of proteins, protein components, vitamins and other growth factors. However, condensed fish solubles have been difficult to utilize because of several properties.

For example, condensed fish solubles contain finely divided, insoluble protein particles which settle out and give rise to a nonuniform product. Also, condensed fish solubles have a marked tendency to gel at temperatures of 50° F. and less. Gels so formed are difficult to remelt because of a hysteresis effect. Also fish solubles contain residual oil which is dispersed in the form of very fine particles and which has been subjected to high temperatures. This oil is highly unsaturated and is sensitive to oxidation. It, therefore, oxidizes very rapidly and, in so doing, it not only gives rise to offensive odors but the oxidation products, such as hydroperoxides and peroxides, cause oxidative deterioration of nutritive values such as vitamin A, carotene and certain of the B complex vitamins contained in feedstuffs with which the fish solubles are mixed.

Previously it has been proposed to improve fish press water, fish stick water or condensed fish solubles by two different methods. One of these methods is by proteolysis. That is, the insoluble proteins are solubilized by the action of an added proteolytic enzyme such as papain. The other method is to coagulate and remove the insoluble or readily coagulable proteins by the addition of a protein coagulant such as sulfuric acid. Both of these prior methods have serious disadvantages. Thus, neither of these methods solves the problem of gelling at low temperatures in a practical manner, and neither of them solves the problem posed by residual, easily oxidized oil. Also, that method which removes the solid proteins by coagulation has the disadvantage that the removal of these proteins detracts from the nutritive value of the fish solubles. Thus a large part of the riboflavin content of condensed fish solubles is removed, and the amino acid pattern is impoverished. That method which effects proteolysis to solubilize the insoluble proteins is not only difficult to carry out on a large scale but also is likely to impoverish its nutritive value. Also it is a method which is difficult to carry out.

It is an object of the present invention to provide an improved method of treating fish press water and/or its derivatives such as fish stick water and condensed fish solubles.

It is a further object of the invention to provide fish stick water and condensed fish solubles of an improved character.

It is a particular object of the invention to provide a method of treating fish stick water and the like which will peptize the insoluble proteins without causing proteolysis and which will render the product stable against gelling at low temperatures.

It is a further particular object of the invention to provide condensed fish solubles in a form which is resistant to gelling, in which solid protein particles do not settle out and in which the residual oil is stabilized against oxidation.

These and other objects of the invention will be apparent from the ensuing description and the appended claims.

In accordance with our invention we preferably start with fish stick water, i.e., with fish press water from which most of the oil has been removed by heating and centrifuging. However, we may start with fish stick water which has been prepared in other ways; or we may start with fish press water itself. Also, we preferably start with unconcentrated or uncondensed fish stick water, but we may start with a condensed stick water. For convenience, however, ordinary, unconcentrated fish stick water will be referred to hereinafter as the starting material.

We have discovered that raw fish viscera contains substances which will act on fish stick water at high temperatures and in a very short period of time to peptize the insoluble proteins, to disperse such proteins stably in the aqueous phase and to render the fish stick water (and also condensed fish solubles prepared from the fish stick water) nongelling at low temperatures.

We have further found that an antioxidant can be more effectively incorporated in fish stick water processed with raw fish viscera in accordance with our invention.

By fish viscera is meant the waste from fish cannery operations which comprises all or some combination of the following organs. The fore gut (esophagus and stomach), the pancreas, the liver, the gall bladder, the pyloric caeca, the heart, the mid gut (intestine) and the hind gut (rectum). Of course, in some cases some of these organs will not be present, as where the liver is removed for separate processing, and the viscera will usually contain some nonvisceral material such as bone, muscle and connective tissue. The viscera may come from a variety of fish such as tuna, sardines, mackerel, anchovies and salmon.

The raw fish viscera employed may be fresh or thawed frozen viscera or it may be raw viscera that has been preserved by added alcohol, glycerine, propylene glycol or other suitable preservative. The viscera should be ground sufficiently fine to disperse and act readily. However, a fairly coarse grind is sufficient. For example, the viscera may be put through an ordinary meat grinder having ¾" outlet openings, although it may be ground finer.

Fish viscera itself presents a major disposal problem in the fish canning industry. It is known to contain many vitamins and other growth factors in substantial amount, e.g., vitamins A, D, $B_1$, $B_2$, $B_6$, $B_{12}$, pantothenic acid, niacin, biotin and chloine. Fish viscera also contains a complex variety of enzymes and/or enzyme precursors such as fish pepsin (which differs from swine and other pepsin), erepsin or enterokinase and trypsinogen. The enzymes in fish viscera are more heat labile than those from mammalian sources.

The nutritive values in fish viscera would be a valuable adjunct or supplement to animal feeds provided they can be transferred to an animal feed without degradation. It has been proposed to treat raw fish viscera, either alone or with other fish materials such as fresh fish, fish offal or the acid precipitate of fish press water, by a rather drastic process in which this material is first processed at about 50° C. in an acid medium to effect hydrolysis and then at about the same temperature in an alkaline medium. Besides being very time consuming, this process of treating fish viscera drastically modifies and causes deterioration of the nutritive values.

As stated, in our process raw fish viscera acts at a high temperature and in a short period of time to peptize the insoluble protein and to impart a nongelling characteristic to fish stick water. Preferably the temperature is about 170 to 200° F. The pH may vary widely, e.g., from a pH of 4 to a pH of 8.5. The time of contact need not exceed a few minutes, e.g., five minutes, usually not in excess of about 10 minutes.

Under these conditions of high temperature and short contact time, changes are effected which are illustrated in detail in the specific examples and which cannot be explained on the basis of proteolysis. Thus it is known that at a temperature of 200° C. proteolytic enzymes are largely deactivated. In our process factors present in the raw fish viscera act in some way on the insoluble protein of the stick water to peptize it, and they act also to impart nongelling properties. At the same time the fish viscera becomes uniformly and stably dispersed in the stick water and makes a very important contribution to the nutritive value of the end product.

The raw fish viscera may be employed in widely varying proportions, e.g., from 1 to 200% of the weight of solids in the stick water, preferably about 50 to 100% of the weight of solids in the stick water. Since the solids in fish stick water are usually about 6 to 10% of the weight of stick water, we prefer to add, in most cases, about 3 to 10% of raw fish viscera based on the weight of stick water.

The following specific examples will serve to illustrate the practice and advantages of the invention.

*Example 1.*—15 parts by weight of fish stick water from the canning of tuna were taken. The bulk of the oil had been removed from this stick water by centrifuging. This stick water was divided into three equal lots (lot No. 1, lot No. 2 and Lot No. 3). Each lot was heated to 200° F. To lot No. 1 was added raw, ground tuna viscera in the amount of 4% of the weight of stick water. Lot No. 1 was then stirred thoroughly at 200° F. for 5 minutes, after which the temperature was raised to boiling and the mixture was passed through a 40 mesh screen to remove connective tissue and bones contributed by the raw viscera. Lot No. 1 was then cooled to room temperature and its pH was adjusted to 4.5. A portion of lot No. 1 was then set aside overnight in a refrigerator at −4° C. and the remainder was evaporated to 50% solids and placed in the same refrigerator.

Lot No. 2 was treated in the same manner except that, instead of raw fish viscera, a proteolytic enzyme (papain) was added. The pH was 6.5 (optimum for papain) and the papain was added in the amount of 0.1% of the weight of stick water, which is far in excess of that usually employed for proteolysis. After cooling, as in the case of lot No. 1, the pH was adjusted to 4.5.

Lot No. 3 was a control to which nothing was added but which was heated, stirred, etc. as in the case of lots Nos. 1 and 2.

Results were as shown in Table I below.

*Table I*

UNCONCENTRATED PRODUCT

| | Lot No. 1 (Viscera treated) | Lot No. 2 (Papain treated) | Lot No. 3 (Control) |
|---|---|---|---|
| Gel formation after −4° C. storage overnight. | No gel formed | Set to stiff gel | Set to stiff gel. |
| Separation of solid particles | No separation | Solid particles settled to a paste-like layer with gel above. | Solid particles settled to a paste-like layer with gel above. |

CONCENTRATED PRODUCT

| | | |
|---|---|---|
| Gel formation | No gel formed down to −4° C. | Solid gel formed at 10° to 12° C. |
| Separation | On warming to 40° C., then cooling to room temperature, no separation over 4 week period. | On warming to 40° C., these samples reliquefied but on cooling to room temperature and standing, they started immediately to separate and after 4 weeks a heavy paste layer formed on bottom which was very difficult to recombine with upper aqueous layer. |

As stated above, one difficulty encountered previously with fish stick water and condensed fish solubles has been the oxidation of residual oil with attendant odor and deterioration of food value. We have discovered a means of stabilizing this residual oil and we have found that the viscera treated product of our invention is especially well adapted for use with this method.

The residual oil left in fish stick water appears to be tightly bound to or intimately associated with the insoluble protein particles in the stick water, and it is difficult to infuse this finely dispersed oil with antioxidant. That is to say, the obvious solution of the problem of oxidation of residual oil is to add an antioxidant, but this expedient breaks down in practice because of the great difficulty of placing the antioxidant where it will be most effective, i.e., in the dispersed oil particles.

We have discovered that it is advantageous to dissolve an antioxidant in a fatty oil; emulsifying the fatty oil (containing dissolved antioxidant) in water; and then add the emulsion to the fish stick water. The emulsion will break and the fatty oil solution of antioxidant will dissolve or disperse in the oil contained in fish stick water. This method of incorporating antioxidant in fish stick water and the like is especially advantageous when applied to the viscera treated stick water of our invention.

The antioxidant employed may be any antioxidant which is permissible in the end product; e.g., the antioxidant may be 2,6-di-tert. butyl-4-methyl phenol (which is commonly called butylated hydroxy toluene), 6-ethoxy-1, 2-dihydro-2,2,2-trimethylene quinoline, propyl gallate or butylated hydroxy anisole. Propyl gallate has the structural formula

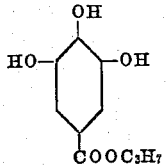

and butylated hydroxy anisole is a mixture of about 85% 3-tert. butyl anisole.

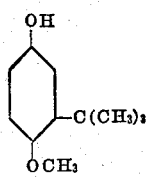

and 15% of the 2-tert. butyl isomer.

The oil employed to dissolve the antioxidant may be any fatty oil which is stable toward oxidation and does not itself have a strong tendency to become rancid. Vegetable oils are preferred, e.g., cottonseed oil and soybean oil. The antioxidant may be dissolved in the oil in any suitable amount, e.g., 1 to 10% by weight.

This oil solution of antioxidant is then emulsified in water and the emulsion is added to the fish stick water. The preferred emulsifying agent is a water dispersible lecithin, but other emulsifying agents may be used.

The following example will serve to illustrate this aspect of our invention.

*Example 2.*—Two equal lots (lots A and B) of fish stick water were taken. Lot A was treated with raw fish viscera as in the case of lot No. 1 in Example 1. Lot B was a control lot; i.e., it was heated to boiling, cooled to room temperature and adjusted to a pH of 4.5. Both cooled lots were then treated with antioxidant emulsion as follows: The emulsion was prepared by dissolving 10% of butylated hydroxy toluene in vegetable oil; preparing an aqueous emulsion of a water dispersible lecithin; and then emulsifying the vegetable oil solution of antioxidant in the lecithin emulsion. The resulting antioxidant emulsion was stirred into lots A and B in amounts to incorporate 0.05% of antioxidant based on the weight of residual fish oil.

This emulsion dispersed rapidly and completely in both lots and after about 10 minutes the discrete particles in each became very flocculent. After 24 hours standing marked differences developed between the two lots.

Thus lot A separated into a small creamy upper layer (2%); a main, creamy, uniform dispersion (78%); and a fluffy, flocculent bottom layer (20%) which was very easily redispersed in the main layer. Lot B gave rise to a top oily layer (2%); a thick creamy layer (3%) beneath the top layer; a main layer (84%) in the form of a thin, almost translucent dispersion; a clear menstruum (8%) beneath the main layer; and a bottom layer of pasty sludge (3%) which was difficult to redisperse.

Each lot was concentrated to 50% solids. Each concentrated lot remained nonrancid during months of storage at room temperature, but concentrated lot A (viscera treated) was much superior because it remained free flowing down to —4° C. and did not separate or stratify after weeks of storage. Lot B (the control lot) gelled at 12° C. and on standing it stratified into an oily cream on top, a translucent middle layer and a heavy pasty layer at the bottom.

As used in the following claims, the phrase "fish press water" means not only aqueous fish waste of the type technically known as fish press water, but also derivatives such as fish stick water and condensed fish solubles. By "peptization" as applied to the action of raw fish viscera on fish press water and fish stick water is meant a physicochemical phenomenon in which the insoluble proteins are altered without being broken down at the amino acid linkages but in a manner such that the proteins will disperse and remain dispersed in water. This action is to be distinguished from proteolytic action which breaks amino acid linkages and forms simpler protein components which are truly soluble. In our "peptization" process the proteins are not broken down in this manner but are peptized so as to remain stably dispersed.

It will, therefore, be apparent that a novel and very useful method has been provided for improving fish press water and fish stick water, such method making use of raw fish viscera in a manner which preserves the nutritive qualities of both the press or stick water solids and of the fish viscera. It will also be apparent that a novel and very useful products are obtained.

We claim:

1. A method of recovering fish solubles which comprises mixing fish stick water and comminuted raw fish viscera, said stick water containing discrete particles of insoluble proteins and also dissolved proteins and other nutritional materials; heating the said mixture of stick water and viscera at a pH of 4 to 8.5, at a temperature of about 170 to 200° F., and for a period of time sufficient to peptize and disperse the insoluble proteins; then cooling the treated liquor and separating nonprotein solid particles; then evaporating the liquor to a substantially higher solids content.

2. A method of improving waste products of fish canning which comprises providing fish press water, mixing the same with comminuted raw fish viscera, heating the mixture at about 170° to 200° F. for a short period of time and then cooling the mixture, said temperature and time being sufficient to peptize the protein solids in the press water and form a stable dispersion which is resistant to gelling at reduced temperatures.

3. A method of improving waste products of fish canning which comprises providing fish press water, mixing the same with comminuted raw fish viscera, heating the mixture at about 170° to 200° for a period of time not in excess of about 10 minutes and then cooling the mixture, said temperature and time being sufficient to peptize the protein solids in the press water and form a stable dispersion which is resistant to gelling at reduced temperatures.

4. A method of producing a liquid proteinaceous product containing substantially all of the proteins of fish press water and raw fish viscera in dispersed form wherein the dispersed proteins are resistant to settlement and to gelling and wherein the proteins are in relatively undegraded form as compared to the proteins in the original press water and viscera, said method comprising mixing the viscera in comminuted form with the press water, said viscera being present in the proportion of about 50 to 100% of the solids in the press water, and subjecting the mixture to a temperature of about 170 to 200° F. for a time not exceeding about 10 minutes sufficient to peptize and disperse the proteinaceous solids without appreciable proteolysis, and then evaporating the product to form a fish solubles concentrate.

5. An aqueous dispersion of proteinaceous material derived from raw fish viscera and fish press water wherein the proteins are present in substantially unaltered form and are not substantially degraded by proteolysis, said proteins being stably dispersed in the aqueous phase, and having a low gel point.

6. The aqueous dispersion of claim 5 in concentrated form and having a gel point below about 0° C.

7. A stabilized fish protein product comprising a low gelling, stable aqueous dispersion of protein solids derived from raw fish viscera and fish press water without substantial proteolysis, said solids containing fish oil which is prone to oxidation and which readily becomes rancid, said oil containing dispersed therein a solution of an antioxidant, said solution having an oxidationally-stable fatty oil as the solvent.

References Cited in the file of this patent

UNITED STATES PATENTS

| | | |
|---|---|---|
| 2,454,315 | Gunther | Nov. 23, 1948 |
| 2,690,396 | Chenicek | Sept. 28, 1954 |
| 2,806,790 | Bedford | Sept. 17, 1957 |